United States Patent
Gaur et al.

(10) Patent No.: US 7,814,186 B2
(45) Date of Patent: Oct. 12, 2010

(54) METHODS AND SYSTEMS FOR INTELLIGENT RECONFIGURATION OF INFORMATION HANDLING SYSTEM NETWORKS

(75) Inventors: Madhulika Gaur, Austin, TX (US); Patrick Yu, Austin, TX (US); Hye R. Kim, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 206 days.

(21) Appl. No.: 12/290,922

(22) Filed: Nov. 5, 2008

(65) Prior Publication Data

US 2010/0115068 A1    May 6, 2010

(51) Int. Cl.
*G06F 15/173* (2006.01)
(52) U.S. Cl. ................................ 709/221
(58) Field of Classification Search ........... 709/221, 709/224
See application file for complete search history.

(56) References Cited

U.S. PATENT DOCUMENTS

| | | | |
|---|---|---|---|
| 5,619,614 A * | 4/1997 | Payne et al. ............... 706/1 |
| 5,647,231 A * | 7/1997 | Payne et al. ............ 68/12.01 |
| 6,192,470 B1 | 2/2001 | Kelley et al. |
| 6,208,870 B1 * | 3/2001 | Lorello et al. ............. 455/466 |
| 6,263,382 B1 | 7/2001 | Bartlett et al. |
| 6,459,904 B1 * | 10/2002 | Lorello et al. ............. 455/466 |
| 6,578,141 B2 | 6/2003 | Kelley et al. |
| 6,760,684 B1 | 7/2004 | Yang et al. |
| 6,873,627 B1 * | 3/2005 | Miller et al. ............... 370/466 |
| 7,334,156 B2 * | 2/2008 | Land et al. ................... 714/7 |
| 7,710,961 B2 * | 5/2010 | Miller et al. ............... 370/390 |

OTHER PUBLICATIONS

Dell, "Dell Exchange 2003 Advisor", Printed From Internet Sep. 25, 2008, 3 pgs.
Dell, Dell SQL Advisor, Printed, Printed From Internet Sep. 25, 2008, 3 pgs.
Hang Ng et al., "System and Method for Configuring Networked Enterprise Information Handling System Solutions From a Product and Options Template", Filed Jan. 23, 2008, U.S. Appl. No. 12/018,324, 24 pgs.
Dell, "Dell Oracle 10g Advisor", Printed From Internet Oct. 4, 2008, 2 pgs.

* cited by examiner

*Primary Examiner*—David Y Eng
(74) *Attorney, Agent, or Firm*—O'Keefe, Egan, Peterman & Enders LLP

(57) ABSTRACT

Methods and systems for automatically and/or intelligently reconfiguring a configuration of networked information handling systems based on change/s in user requirement values. A user may be allowed to adapt a system configuration originally recommended, for example, by a conventional configuration tool in order to meet a given set of user requirement parameters, or to optimize such a recommended configuration for the user. A user may be provided with a recommendation of which user requirement parameter/s needs to be changed (and optionally by how much a value of the user requirement parameter/s needs to be changed) in order to achieve a targeted networked system configuration, i.e., by changing a specific information handling system configuration variable/s.

21 Claims, 3 Drawing Sheets

METHODS AND SYSTEMS FOR INTELLIGENT RECONFIGURATION OF INFORMATION HANDLING SYSTEM NETWORKS

FIELD OF THE INVENTION

This invention relates generally to information handling systems and, more particularly, to reconfiguration of information handling system networks.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be assembled into networked systems that include storage, such as storage area network (SAN) or direct attached storage (DAS) systems. Such networked storage systems typically include components such as storage management devices (e.g., one or more servers), interconnection hardware (e.g., network switches, high speed bus lines) and storage devices (e.g., disk drives). It is often desired that networked storage systems be configured and assembled in a manner that provides data storage redundancy (i.e., allowing for storage of multiple copies of the same data). It is also common that a networked storage system be configured in a manner that addresses current storage needs and that also provides for future scalability, e.g., so that additional storage devices and/or storage management devices may be added over time to increase system performance.

A configuration tool is an algorithm program employed to size a networked system solution (such as networked storage system) for a user. Such a configuration tool operates by having a user describe the requirements of the networked system solution by answering a set of questions (e.g., processor utilization, response time, storage, database size, transaction ratio, type of databases, input/output (IO) throughput, etc.), after which the configuration tool translates the requirements to a particular system configuration for the solution. Examples of such configuration tools are the Dell SQL Advisor Tool, and the Dell Oracle Advisor tool.

SUMMARY OF THE INVENTION

Disclosed herein are methods and systems for automatically and/or intelligently reconfiguring a configuration of networked information handling systems based on change/s in user requirement values. Unlike conventional configuration tools, the disclosed methods and systems may be configured to intelligently and interactively inform or recommend to a user which user requirement parameter/s needs to be changed (and optionally by how much a value of the user requirement parameter/s needs to be changed) in order to achieve a targeted networked system configuration, i.e., by changing a specific information handling system configuration variable/s. The disclosed methods and systems may be advantageously implemented to allow a user to adapt a system configuration originally recommended, for example, by a conventional configuration tool in order to meet a given set of user requirement parameters, or to optimize such a recommended configuration for the user.

Using the disclosed methods and system, a previously-provided system configuration from a configuration tool may be reconfigured by a user with knowledge of which user requirement parameters/s need to be changed to achieve a targeted system configuration (e.g., to adjust an initial system configuration to meet IT budget or other constraints). Because a user is provided with specific knowledge of which user requirement parameters/s need to be changed, a user is enabled to save time and achieve a targeted system configuration without the time and effort of running multiple configuration iterations of a configuration tool. Further, when implemented as an automatic reconfiguration tool, the disclosed methods and systems allow a user to achieve a targeted system configuration without the need for human intervention, e.g., without the need for the user to consult Technical Sales Representatives.

In one embodiment, the disclosed methods and systems may employ a ruled-based methodology that examines the affects of potential user requirement parameter changes on a targeted system configuration specified by a user. Such a methodology may be implemented in two parts: (a) a set of system configuration heuristic rules are used to define how each system configuration variable is dependent on a set of user requirement parameters; and (b) an algorithm utilizes the heuristic rules to examine the effects of potential user requirement parameter changes to achieve a given targeted system configuration.

In such an embodiment, a heuristic rule-based algorithm may be provided that utilizes pre-defined heuristic rules to calculate a new user requirement parameter value for a targeted configuration variable value in the following manner. First, a configuration change tendency is determined by comparing the targeted configuration variable value with the original configuration variable value as determined, for example, by a system configuration tool. Then a heuristic rule that matches the configuration variable name, the condition, and the change tendency is identified. From the identified heuristic rule, a list of user requirement parameters and the change pattern for the given configuration variable will be recommended for the user to select. Once the user selects a user requirement parameter from the list, the second step is to determine the new value of this selected user requirement parameter that will generate the desired targeted configuration variable value by resetting the value of the selected user requirement parameter to a new value. For example, a new value of the selected user requirement parameter may be set equal to the previous value of the user requirement parameter plus a delta value. Then the configuration tool is re-run using this new value of user requirement parameter to calculate a new system configuration variable value. This process may be repeated until either a calculated new configuration variable value matches the targeted configuration variable value, or the new configuration variable value is out of range. Once a match is achieved between a calculated new configuration variable value and targeted configuration variable value, the new user requirement parameter value corresponding to the matching target configuration variable value is selected.

In another embodiment, a system configuration tool may be implemented and employed to calculate one or more configuration variable values for a system based on a set of user requirement parameters. If a user then wants to adjust one or more configuration variable values from the current system configuration, a system reconfiguration tool may be provided (either as part of the system configuration tool or as a separate tool from the system configuration tool), and the user may be allowed to enter one or more targeted configuration variable values for adjustment into the system reconfiguration tool. Using the previously described heuristic rule-based algorithm, the system reconfiguration tool may be configured to analyze the user-entered targeted configuration variable value/s and to calculate how the user requirement parameter value/s should be changed to achieve the targeted system configuration variable value/s. The user may then be given the option to accept the calculated new user requirement parameter value/s. If the user accepts the calculated new user requirement parameter value/s, the user has found a system configuration solution that meets the solution requirement and the targeted system configuration variable value/s. If the user does not accept the calculated new user requirement parameter value/s, then the user may select a different user requirement parameter for change of value. FIG. 2 shows how users can use this tool to redefine the solution configuration.

In one respect disclosed herein is a method of reconfiguring an initial system configuration of networked information handling systems, the method including: providing a set of system configuration heuristic rules stored on a storage medium, each of the system configuration heuristic rules defining how the value of a given configuration variable of the initial system configuration is dependent on the value of one or more user requirement parameters; accessing the stored system configuration heuristic rules from the storage medium; and utilizing the accessed set of system heuristic rules to determine the effects of one or more changes in the value of the one or more user requirement parameters on the value of the given configuration variable in order to achieve a new system configuration of networked information handling systems having a new targeted value of the given configuration variable. In the practice of this method, the given configuration variable has an initial value in the initial system configuration, and a value of the given configuration variable has the new targeted value in the new system configuration.

In another respect, disclosed herein is a computer program of instructions embodied in a tangible computer readable medium, the computer program including instructions when executed that are configured to: compare a new targeted value of a given user-configuration variable to an initial value of the given user-configuration variable and determine if the new targeted value is greater or less than the initial value of the given user-configuration variable; and select a heuristic rule based on the results of a comparison of the new targeted value of the given user-configuration variable to an initial value of the given user-configuration variable, the heuristic rule defining the relationship between an upward change in the given user configuration variable and a corresponding change in one or more user requirement parameter values if the targeted value is greater than the initial value of the given user-configuration variable or the heuristic rule defining the relationship between a downward change in the given user configuration variable and a corresponding change in one or more user requirement parameter values if the targeted value is less than the initial value of the given user-configuration variable.

In another respect, disclosed herein is a method of reconfiguring an initial system configuration of networked information handling systems, the method including: determining a change tendency for a given configuration variable of an initial system configuration of networked information handling systems by comparing a targeted configuration variable value with an initial configuration variable value for the given configuration variable; accessing a storage medium containing a set of system heuristic rules, each of the system heuristic rules defining how the change tendency for the value of a configuration variable of the initial system configuration is dependent on the value of one or more user requirement parameters; identifying a given one of the accessed system heuristic rules that matches an identity of the given configuration variable and the determined change tendency for the given configuration variable; and utilizing the identified given one of the system heuristic rules to determine a new value for one of the user requirement parameters contained in the identified system heuristic rule, the new value for the user requirement parameter resulting in a new system configuration of networked information handling systems having a value for the given configuration variable that matches the targeted configuration variable value.

DESCRIPTION OF ILLUSTRATIVE EMBODIMENTS

Figure 1A:
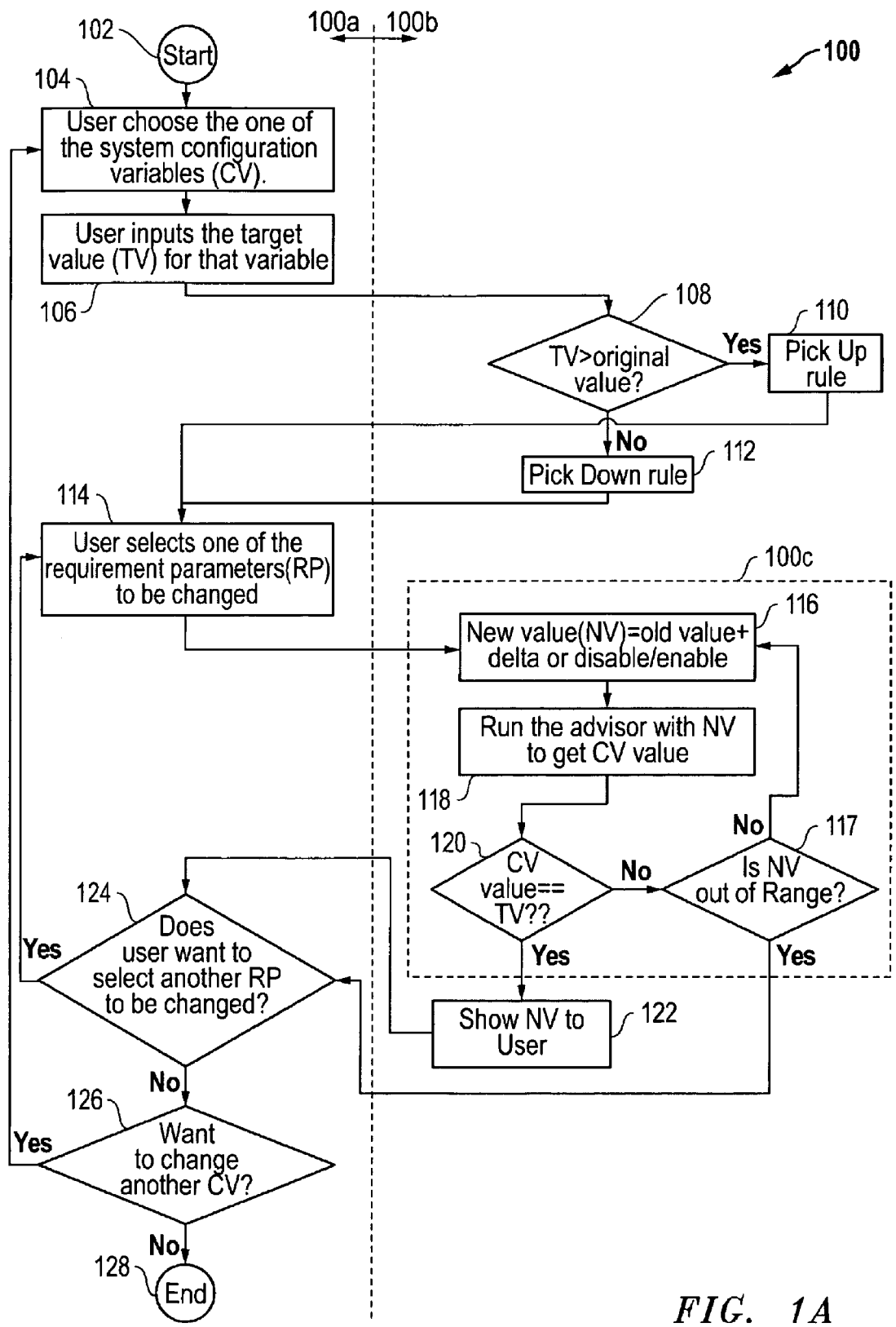
FIG. 1A illustrates methodology for reconfiguration of information handling system networks according to one exemplary embodiment of the disclosed methods and systems.
Figure 1B:
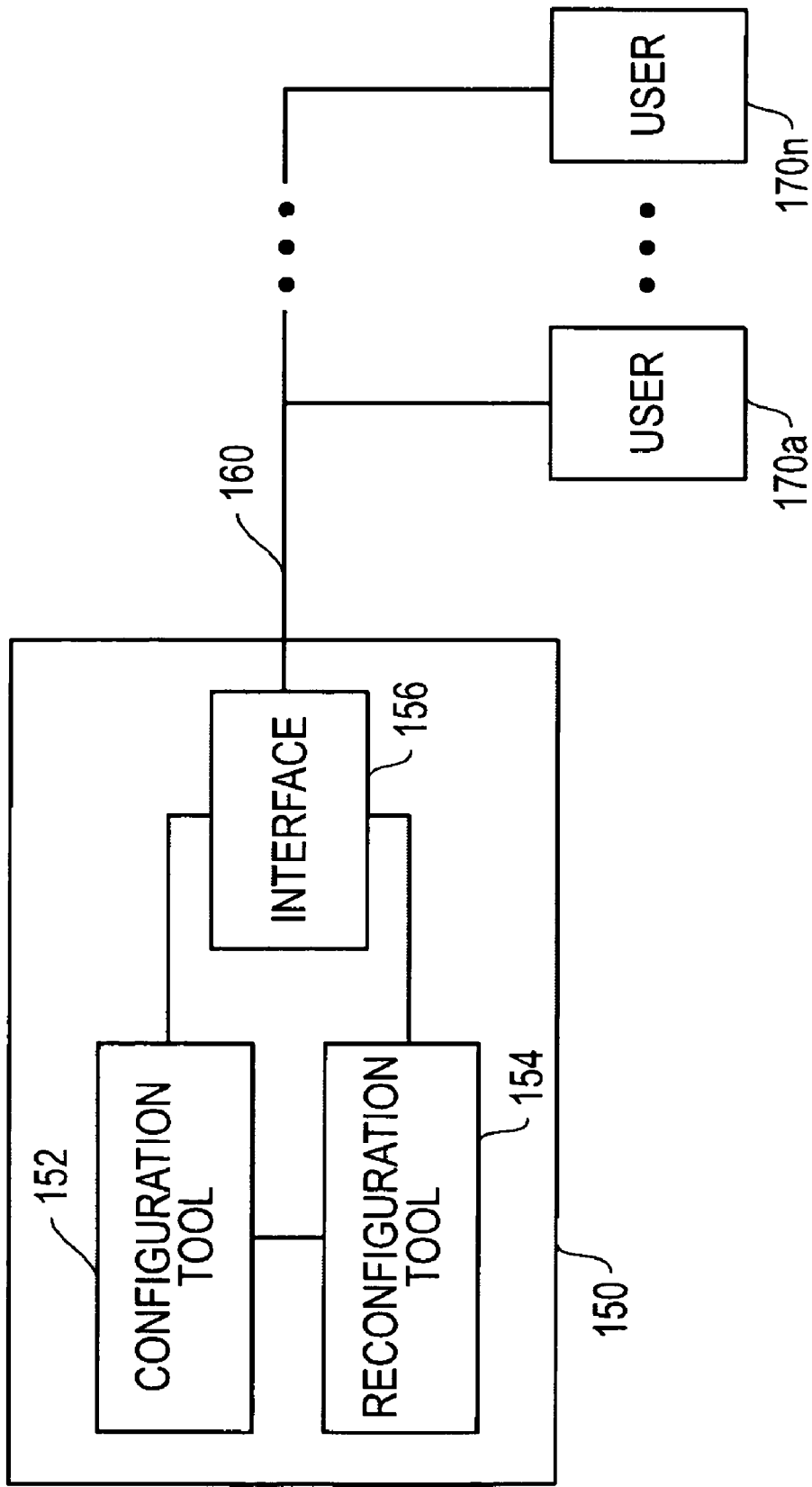
FIG. 1B is a block diagram of an information handling system configured as a network server that is networked with one or more users according to one exemplary embodiment of the disclosed methods and systems.

FIG. 1A illustrates methodology 100 for reconfiguration of information handling system networks according to one exemplary embodiment of the disclosed methods and systems. As shown in FIG. 1A, methodology 100 includes an interface with user side steps 100a and reconfiguration algorithm side steps 100b which may be, for example, a computer program of sequential instructions embodied in a tangible computer readable medium (e.g., storage medium such as optical or magnetic storage disk, nonvolatile memory, magnetic tape, etc.) that is executing on a processor of an information handling system configured as a network server 150 as illustrated in FIG. 1B. In this regard, methodology 100 may be executed on an information handling system for purposes of reconfiguring an information handling system or network of information handling systems. Also shown in FIG. 1A are new user requirement parameter value calculation steps 100c that are a part of reconfiguration algorithm side steps 100b.

Reconfiguration algorithm side steps 100b may be executing, for example, as a reconfiguration algorithm on server 150 of FIG. 1B accessed by one or more users 170 over a network 160 (e.g., Internet). In this regard, such a reconfiguration algorithm may be incorporated to run as part of a system configuration tool after other algorithm component/s of the configuration tool define an initial system configuration recommendation, or a reconfiguration algorithm may be run as a stand-alone reconfiguration tool 154 provided separate from a system configuration tool 152 into which configuration variables of an initial system configuration are input (e.g., input manually by a user or as a dataset) as shown in FIG. 1B.

With regard to the exemplary embodiment of FIG. 1B, a reconfiguration algorithm may be provided as a reconfiguration tool 154 that interacts with a system configuration tool 152 with both executing on server 150 as shown. As shown, each of system configuration tool 152 and reconfiguration tool 154 communicate across network 160 (e.g., Internet) with one or more users 170 via interface 156. As will be described further herein, user/s 170 may interact with system configuration tool 152 to obtain an initial recommended system configuration, and then with reconfiguration tool 154 to obtain a reconfiguration of the previously-defined initial configuration to achieve a targeted networked system configuration based on change/s in user requirement values provided across network 160 from users 170. It will be understood that FIG. 1B is exemplary only, and that the disclosed methods and systems may be implemented using any other system configuration suitable for interfacing an information handling system (upon which an embodiment of the disclosed methodology is executing) with one or more users.

Returning to FIG. 1A, methodology 100 starts in step 102 with an existing and original initial system configuration of networked information handling systems. Such an existing system configuration may be pre-defined, for example, by system configuration tool 152 of FIG. 1B that recommends a specific networked system configuration based on user-defined requirements for the networked system (e.g., maximum processor utilization allowed, maximum input/output throughput, number of concurrent connections, response time, storage, database type, maximum number of transactions, database size, database size, maximum transaction ratio, maximum number of concurrent users, additional amount of memory needed, preferred chip (Intel or AMD), Is high available option required, Is Tape Backup required, Is disaster_recovery option required, etc.). Examples of such system configuration tools include, but are not limited to, configuration tools such as the Dell SQL Advisor Tool, available on the Internet at http:fwww.dell.com/content/topics/global.aspx/sitelets/alliances/microsoft/sql_advisor_tool?c=us&cs=555&1=en&s=biz&~section=sql_advisor, and the Dell Oracle Advisor Tool, available on the Internet at http://advisors.dell.com/advisorweb/Advisor.aspx?advisor:0bf89fb8-d488-4779-97ee-6d2918825773&c=us&1=en&cs=555. Further information on system configuration tools may be found in U.S. patent application Ser. No. 12/018,324 filed Jan. 23, 2008, which is incorporated herein by reference in its entirety.

Still referring to FIG. 1A, an initial storage system configuration of step 102 may include, for example, a given number of networked information handling systems (e.g., configured as servers) and a given number of disk drives that are recommended by a system configuration tool 152 to satisfy user-defined requirements entered by a user 170 for a networked storage system. In such an example, the servers represent a first configuration variable having a value equal to the number of recommended servers, and the disk drives represent a second configuration variable having a value equal to the number or recommended disk drives. Methodology 100 proceeds to step 104 where a user 170 may choose one of the configuration variables (e.g., servers or disk drives) for change, and then input a new targeted value for the chosen configuration variable in step 106. For example, a user 170 may be dissatisfied with an initial recommended system configuration that includes two servers, and may choose instead to specify a target value of only one server in step 104 for the user's desired system configuration. Alternatively, a user 170 may be decide to change the value of other configuration variables (e.g., number of disk drives, number of processors in the server, amount of memory in the server, server model, etc.).

Methodology 100 proceeds in step 108 by analyzing the user input from step 106 to compare the new targeted value (TV) for the user-selected configuration variable to the initial value of the selected configuration variable. If the user-selected target configuration variable value is found greater than the initial configuration variable value (e.g., user 170 desires an increase in the number of servers or increase in the number of disk drives) in step 108, then methodology 100 proceeds to step 110, where a heuristic change tendency "up" rule is chosen to match the user-selected configuration variable (e.g., number of servers, number of disk drives, etc.) and the database type system configuration condition of the initial system configuration. Alternatively, if the user-selected target configuration variable value is found less than the initial value of the user-selected configuration variable value (e.g., user 170 desires an increase in the number of servers or increase in the number of disk drives) in step 108, then methodology 100 proceeds to step 112, where a heuristic change tendency "down" rule is chosen to match the user-selected configuration variable and any other conditions of the initial system configuration. The appropriate chosen heuristic rule is then presented for user-selection to made in step 114.

In one exemplary embodiment, a heuristic rule may be provided to define the relationship between change in a selected configuration variable value and user requirement parameter values in the following format (in which "condition" refers to the database type):

<configuration variable> <--- (<Up-list>, <Down-list>, <Y-List>, <N-List>, <change tendency>, <condition>)

The value of change tendency can be up or down to define that the given rule is for increasing or decreasing the value of the configuration variable, respectively. The four above lists define the user requirement parameters and their changing patterns that contribute to the change tendency of the configuration variable as follows: 'up' for increasing value, 'down' for decreasing value, 'Y' for 'True', 'N' for 'False'. A condition defines the case when this given rule can be applied. In one exemplary embodiment, a set of heuristic reconfiguration rules may be incorporated as part of a configuration tool algorithm design. By defining the heuristic rules, a configuration tool designer may define which configuration variables may be altered, and what kind of user requirement parameter changes are required to alter a given configuration variable value.

Table 1 illustrates exemplary heuristic rules for two configuration variables, number of servers and number of disk drivers, it being understood that heuristic rules may be provided for other types of configuration variables. Heuristic rules, such as those of Table 1, may be stored on storage medium of an information handling system (such as a network server) and accessed or retrieved when needed. As shown in Table 1, eight heuristic rules are provided in this exemplary embodiment that each represent either an "up" desired change tendency or a "down" desired change tendency for a given user-selected configuration variable value in combination with a specific system configuration condition. In this regard, a system configuration condition represents a characteristic of the initial system configuration that is not variable or changeable without obtaining an entirely new system configuration, e.g., by re-running a system configuration tool. In the example of Table 1 two database type conditions are possible, and a separate rule is therefore provided for each database type, Online Transaction Processing (OLTP) and Decision Support Systems (DSS). Each rule of Table 1 also includes an "up list" of user requirement parameter values that may be increased to achieve the desired change tendency of a given rule, and a "down list" of user requirement parameter values that may be selected to achieve the desired change tendency of a given rule. Additionally, each rule of Table 1 also includes a "yes list" of user requirement parameter values that may be enabled to achieve the desired change tendency of a given rule, and a "no list" of user requirement parameter values that may be disabled to achieve the desired change tendency of a given rule.

Rule #3—To decrease the number of servers if the database type is OLTP, one of the following actions needs to be taken: the maximum processor utilization needs to be increased, the number of concurrent users needs to be decreased, High Availability_(HA) needs to be disabled by setting HA=N (No), or Disaster Recovery option (DR) needs to be disabled by setting DR=N(No).

Rule #4—To decrease the number of servers if the database type is DSS, one of the following actions needs to be taken: maximum of processor utilization needs to be increased, maximum input/output throughput needs to be decreased, High Availability (HA) needs to be disabled by setting HA=N (No), or Disaster Recovery option (DR) needs to be disabled by setting DR=N(No).

Rule #5—To increase the number of disk drives if the database type is OLTP, one of the following actions needs to be taken: maximum number of transactions needs to be increased, database size (DBsize) needs to be increased, or DR needs to be enabled by setting DR=Y(Yes).

TABLE 1

Exemplary Heuristic Rules

| Rule No. | Configurable Variable | Change tendency | User Requirement Parameter Value Up-list | User Requirement Parameter Value Down-list | User Requirement Parameter Yes-list | User Requirement Parameter No-list | System Configuration Condition (Database Type) |
|---|---|---|---|---|---|---|---|
| 1 | # of servers | Up | # of concurrent connections, | Max Processor utilization allowed | HA, DR | | DBtype = OLTP |
| 2 | # of servers | Up | Max IO throughput | Max Processor utilization allowed | HA, DR | | DBtype = DSS |
| 3 | # of servers | Down | Max Processor utilization allowed | # of concurrent connections, | | HA, DR | DBtype = OLTP |
| 4 | # of servers | Down | Max Processor utilization allowed | Max IO throughput | | HA, DR | DBtype = DSS |
| 5 | # of Drives | Up | Max transaction, DBsize | | DR | | DBtype = OLTP |
| 6 | # of Drives | Up | Max IO thought, DBsize | | DR | | DBtype = DSS |
| 7 | # of Drives | Down | | Max transaction, DBsize | | DR | DBtype = OLTP |
| 8 | # of Drives | Down | | Max IO thought, DBsize | | DR | DBtype = DSS |

An explanation of the operation of each of heuristic rules of Table 1 is as follows.

Rule #1—To increase the number of servers if the database type (DBtype) is OLTP, one of the following actions needs to be taken: the number of concurrent user connections needs to be increased, the maximum processor utilization needs to be decreased, High Availability (HA) needs to be enabled by setting HA=Y(Yes), or disaster recover option (DR) needs to be enabled by setting DR=Y(Yes).

Rule #2—To increase the number of servers if the database type is DSS, one of the following actions needs to be taken: maximum input/output throughput needs to be increased, maximum processor utilization needs to be decreased, High Availability (HA) needs to be enabled by setting HA=Y(Yes), or disaster recover option (DR) needs to be enabled by setting DR=Y(Yes).

Rule #6—To increase the number of disk drives if the database type is DSS, one of the following actions needs to be taken: maximum input/output throughput needs to be increased, database size (DBsize) needs to be increased, or DR needs to be enabled by setting DR=Y(Yes).

Rule #7—To decrease the number of disk drives if the database type is OLTP, the maximum number of transactions needs to be decreased, the database size (DBsize) needs to be decreased, or DR needs to be disabled by setting DR=N(No).

Rule #8—To decrease the number of disk drives if the database type is DSS, the maximum input/output throughput needs to be decreased, the database size (DBsize) needs to be decreased, or DR needs to be disabled by setting DR=N(No).

It will be understood that the particular heuristic rules of Table 1 (i.e., configuration variables, lists, conditions, and given combinations thereof) are exemplary only, and that other configuration variables, lists and conditions may be implemented in any combination suitable for defining one or more configuration variables that may be altered, and which user requirement parameter changes are required to alter the value of the listed configuration variable. For example, it is possible that a heuristic rule may have only "up" and "down" lists (with no "Y" and "N" lists), may have only "Y" and "N" lists (with no "up" and "down" lists).

Returning to methodology of FIG. 1A, the appropriate heuristic rule is presented for user selection to be made in step 114 based direction of change in user configuration variable value and system configuration condition. For example, either one of rules 1 or 2 are presented to the user 170 if the user-selected targeted configuration variable value represents an increase ("up" change tendency) in the number of servers, and rule #1 is presented if the system configuration database type is OLTP or rule #2 is presented if the system configuration database type is DSS. Similarly either one of rules 3 or 4 are presented to the user 170 if the user-selected configuration variable value represents a decrease ("down" change tendency) in the number of servers, and rule #3 is presented if the system configuration database type is OLTP or rule #4 is presented if the system configuration database type is DSS. Similar methodology applies to rules 5 through 8 if the user-selected configuration variable value represents an increase or decrease in the number of disk drives.

In step 114, a user 170 is allowed to select one requirement parameter for change from the requirement parameters of the "up list", "down list", "yes list" and/or "no list" of the given rule presented to the user 170. For example, if rule #1 is the appropriate heuristic rule corresponding to the user-selected configuration variable value (desired increase in number of servers) and system configuration condition (system configuration database type is OLTP), then a user 170 is allowed to choose whether to increase the number of concurrent user connections, decrease the maximum allowable processor utilization, or to enable HA or DR, in order to increase the number of servers to achieve the user-selected targeted configuration variable value. The selected user requirement parameter is then entered into new user requirement parameter value calculation steps 100c. In step 116 a new value of the selected user requirement parameter is first determined.

For a user-requirement parameter selected from an "up" list or "down" list of the given heuristic rule (e.g., increase in number of concurrent user connections or decrease in maximum allowable processor utilization), a new user requirement parameter value (NV) is determined in step 116 by adding a delta value (e.g., additional number of concurrent user connections or decrease in allowable processor utilization percentage) to the old or initial user requirement parameter value. The particular delta value may be a previously defined incremental value of, for example, empirical or arbitrary selection for the particular user-requirement parameter that is being changed, e.g., + or −100 user connections or + or −10% processor utilization. Alternatively, for a user-requirement parameter selected from a "yes" list or "no" list of the given heuristic rule, a new user requirement parameter value (NV) is determined by changing the user requirement parameter value from "enabled" to "disabled, or from "disabled" to "enabled" in step 116 as appropriate.

The original configuration tool is then re-run in step 118 with the calculated new user requirement parameter value to determine a new system configuration that includes a new value of the user-selected configuration variable. The new value of the user-selected configuration variable is then compared to the user's targeted value of configuration variable in step 120. If the new value of configuration variable matches the targeted value of configuration variable, then the new system configuration and new value of user requirement parameter value (NV) is shown to the user 170 in step 122. However, if the new value of configuration variable does not match the targeted value of configuration variable in step 120, then it is determined in step 117 whether the new user requirement parameter value (NV) falls outside the boundary of a range of acceptable values, e.g., a range of acceptable processor utilization values may be selected to be between 0% processor utilization and 80% processor utilization. If the new user requirement parameter value (NV) does not fall outside the boundary of acceptable values (e.g., processor utilization falls within the range of from 0% to 80% in the previous example), steps 116 through 120 are repeated until a match is achieved. However, if it is determined in step 117 that the new user requirement parameter value (NV) falls outside the boundary of acceptable values for that user requirement parameter value (e.g., processor utilization falls outside the range of from 0% to 80% in the previous example), then methodology 100 proceeds to step 124 where the user 170 is given the opportunity to select a different requirement parameter for change than the requirement previously selected in step 114.

In step 124 of methodology 100, the user 170 is given the opportunity to select a different requirement parameter for change than the requirement previously selected in step 114. If the user 170 chooses to select a different requirement parameter to change, then methodology 100 returns to step 114 where the user 170 makes another selection from the "up list", "down list", "yes list" and/or "no list" of the given rule presented to the user 170. Then steps 116 through 124 are repeated again, starting with the original initial system configuration and the previously selected configuration variables new targeted value of steps 104 and 106. However, if the user 170 decides not to select a different requirement parameter in step 124, then methodology 100 proceeds to step 126, where the user 170 is given the opportunity to select a new configuration variable and new targeted value of the selected configuration variable. If the user 170 decides to select a new configuration variable in step 126, then methodology 100 returns to step 104, and steps 104 through 126 are repeated, starting with the original initial system configuration. If the user 170 does not desire to select a new configuration variable in step 126, then methodology 100 proceeds to ending step 128 and accepts the new system configuration with new value of user requirement parameter value.

Figure 2:
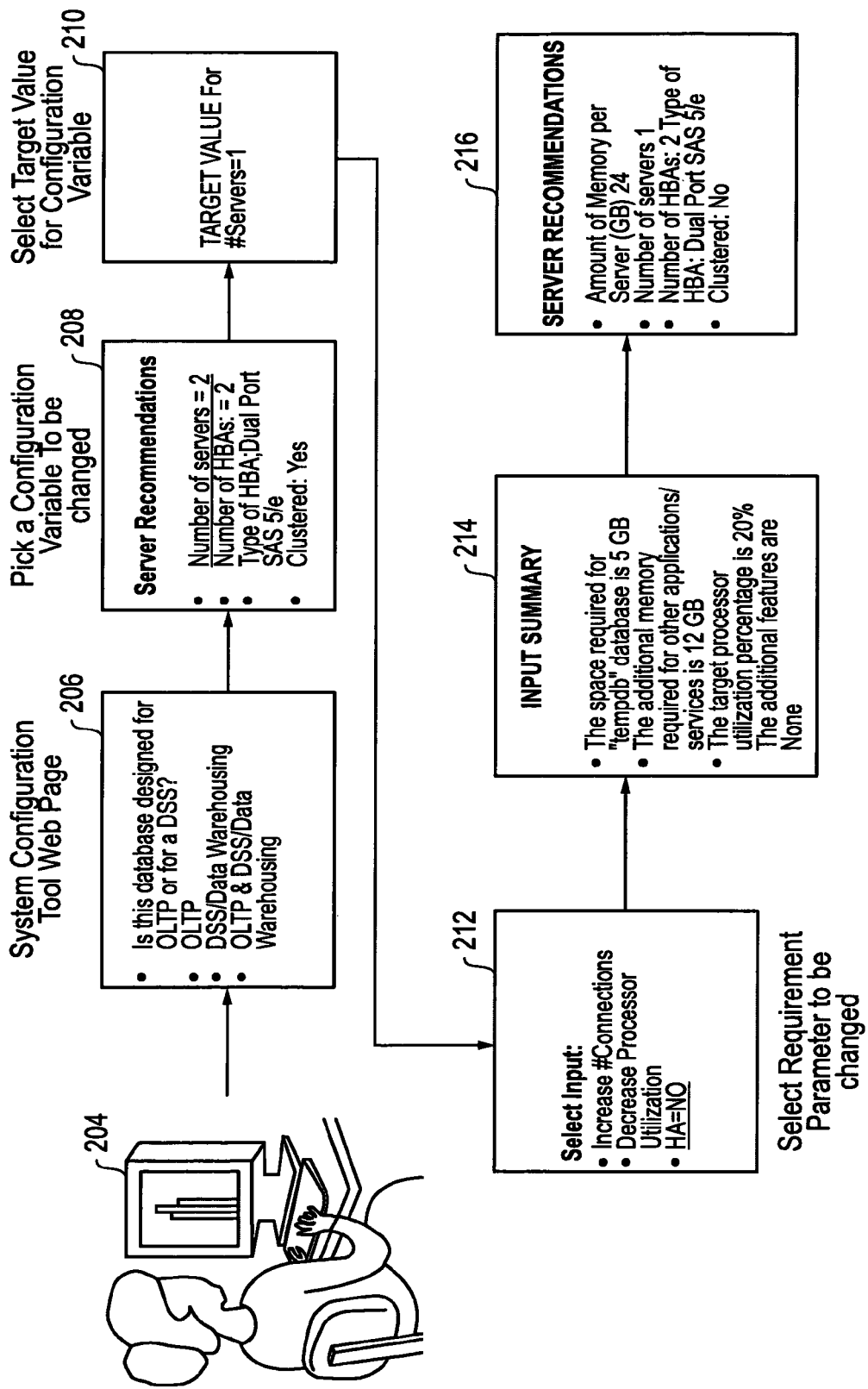
FIG. 2 illustrates interaction of a human user with a configuration tool and reconfiguration tool according to one exemplary embodiment of the disclosed methods and systems.

FIG. 2 illustrates interaction of a human user 170 using an information handling system 204 (e.g., across a network such as the Internet or an Intranet) with a configuration tool and reconfiguration tool (e.g., running on a network server) according to one exemplary embodiment of the disclosed methods and systems. As shown in FIG. 2, the configuration tool presents user 170 with an initial web page 206 where user 170 may enter user-defined requirements, such as database type, server type, storage technology, etc. The configuration tool returns with an original initial recommended system configuration (e.g., initial server recommendations) displayed on web page 208 that is based on the requirements input by user 170, and that includes a number of configuration variable values as shown (e.g., including a number of servers that is equal to 2). At web page 210, the reconfiguration tool allows user 170 to select a target configuration variable value for change (e.g., FIG. 2 shows user selected target configuration variable is number of servers, and target configuration variable value is 1), corresponding to steps 104 and 106 of FIG. 1. At web page in web page 212, a list of requirement parameters that may be changed are presented to user 170 by the reconfiguration tool, and user 170 is allowed to select one of the requirement parameters that may be changed (e.g., FIG. 2 shows user selected requirement parameter is HA="NO"), corresponding to step 114 of FIG. 1A. After user selection of requirement parameter to change, webpage 214 presents an input summary to the user 170. This input summary is a summary of the requirement parameters selected by the user. The configuration tool is then re-run with the new requirement parameter value and webpage 216 displays the new recommended system configuration (e.g., new server recommendations) to user 170 following the new user requirement parameter value calculation steps 100c of FIG. 1A. Display of webpage 216 corresponds to step 122 of FIG. 1A and includes new value of configuration variable matching the target value of configuration variable selected by user 170 at webpage 210 and step 106 of FIG. 1A, and also includes the new system configuration and new user requirement parameter values.

It will be understood that the specific steps and order of steps shown in FIGS. 1A and 2 are exemplary only, and that any combination and order of fewer, additional or alternative steps may be employed that is suitable for automatically and/or intelligently reconfiguring an existing or previously-defined configuration of networked information handling systems to achieve a targeted networked system configuration based on change/s in user requirement values in a manner as disclosed herein. Furthermore, it will be understood that the methodology of FIGS. 1 and/or 2 may be implemented as part of a build to order methodology in one exemplary embodiment, i.e., once a user accepts a new system configuration (e.g., at step 128 of FIG. 1), components of the new system configuration may be assembled and shipped from one or more assembly facilities to the user's designated address.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic-device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of reconfiguring an initial system configuration of networked information handling systems, the method comprising:
   providing a set of system configuration heuristic rules stored on a storage medium, each of said system configuration heuristic rules defining how the value of a given configuration variable of said initial system configuration is dependent on the value of one or more user requirement parameters; and
   accessing said stored system configuration heuristic rules from said storage medium;
   utilizing said accessed set of system heuristic rules to determine the effects of one or more changes in the value of said one or more user requirement parameters on the value of said given configuration variable in order to achieve a new system configuration of networked information handling systems having a new targeted value of said given configuration variable;
   wherein a value of said given configuration variable has an initial value in said initial system configuration; and
   wherein a value of said given configuration variable has said new targeted value in said new system configuration.

2. The method of claim 1, wherein said heuristic rules are stored on a storage medium of an information handling system; and wherein said method further comprises receiving at said information handling system said targeted value of said given configuration variable.

3. The method of claim 1, wherein said information comprises a network server; and wherein said method further comprises receiving at said network server said targeted value of said given configuration variable across a network from a user.

4. The method of claim 3, further comprises receiving at said network server a user selection of one of said user requirement parameters across a network from a user; utilizing said accessed set of system heuristic rules to determine a new value of said selected user requirement parameter; determining a new value of said given configuration value based on said new value of said selected user requirement parameter; and providing a new system configuration of networked information handling systems based on said new value of said given configuration value.

5. The method of claim 4, further comprising presenting said new value of said given configuration value from said network server to said user across said network.

6. The method of claim 5, further comprising receiving at said network server a user selection of a second and different one of said user requirement parameters across said network from said user; utilizing said accessed set of system heuristic rules to determine a new value of said second and different selected user requirement parameter; determining a new value of said given configuration value based on said new value of said second and different user requirement parameter; providing a second new system configuration of networked information handling systems based on said new value of said given configuration value; and presenting said second new value of said given configuration value from said network server to said user across said network.

7. The method of claim 5, further comprising receiving at said network server a targeted value of a second and different configuration variable across said network from said user; receiving at said network server a second user selection of one of said user requirement parameters across a network from a user; utilizing said accessed set of system heuristic rules to determine a new value of said second selected user requirement parameter; determining a new value of said second and different configuration value based on said new value of said second selected user requirement parameter; providing a new system configuration of networked information handling systems based on said new value of said second and different configuration value; and presenting said new value of said second and different configuration value from said network server to said user across said network.

8. The method of claim 1, further comprising:
(a) determining the effects of one or more changes in the value of said one or more user requirement parameters on the value of said given configuration variable by determining a new value of said given configuration variable based on a new value of one of said user requirement parameters;
(b) then comparing said new value of said given configuration variable to said new targeted value of said given configuration variable to determine if said new value of said given configuration variable matches said new targeted value of said given configuration variable; and
then repeating steps (a) and (b) one or more times until said new value of said given configuration variable matches said new targeted value of said given configuration variable, said steps (a) and (b) being repeated each time with different new value of said one of said user requirement parameters.

9. The method of claim 1, further comprising assembling components of said new system configuration of networked information handling system.

10. A computer program of instructions embodied in a tangible computer readable medium, said computer program comprising instructions when executed that are configured to:
compare a new targeted value of a given user-configuration variable to an initial value of said given user-configuration variable and determine if said new targeted value is greater or less than said initial value of said given user-configuration variable; and
select a heuristic rule based on the results of a comparison of said new targeted value of said given user-configuration variable to an initial value of said given user-configuration variable, said heuristic rule defining the relationship between an upward change in said given user configuration variable and a corresponding change in one or more user requirement parameter values if said targeted value is greater than said initial value of said given user-configuration variable or said heuristic rule defining the relationship between a downward change in said given user configuration variable and a corresponding change in one or more user requirement parameter values if said targeted value is less than said initial value of said given user-configuration variable.

11. The computer program of instructions of claim 10, further comprising instructions when executed that are configured to:
present an initial system configuration of networked information handling systems to a user, said initial system configuration including one or more configuration variables that each have an initial value; and
receive a first input from said user, said first user input representing said new targeted value for said given user configuration variables.

12. The computer program of instructions of claim 11, further comprising instructions when executed that are configured to:
present said selected heuristic rule to said user;
receive a second input from said user, said second user input representing a selection of one of said user requirement parameter values of said presented heuristic rule for change; and
present a new system configuration to said user, said new system configuration including said selected and changed user requirement parameter value of said presented heuristic rule, and said new system configuration including said selected user-configuration variable having said new targeted value.

13. The computer program of instructions of claim 12, further comprising instructions when executed that are configured to follow the steps of claims 10 through 12 by at least one of:
allowing said user to select another one of said user requirement parameter values of said presented heuristic rule for change and again presenting a new system configuration to said user, said new system configuration including said selected and changed another user requirement parameter value of said presented heuristic rule, and said new system configuration including said selected user-configuration variable having said new targeted value; or
allowing said user to select a new targeted value for another one of said user configuration variables and repeating the steps of claims 9 and 11 based on said selected new targeted value for said another one of said user configuration variables, or
a combination thereof.

14. A method of reconfiguring an initial system configuration of networked information handling systems, the method comprising:
determining a change tendency for a given configuration variable of an initial system configuration of networked information handling systems by comparing a targeted configuration variable value with an initial configuration variable value for said given configuration variable;
accessing a storage medium containing a set of system heuristic rules, each of said system heuristic rules defining how the change tendency for the value of a configuration variable of said initial system configuration is dependent on the value of one or more user requirement parameters;
identifying a given one of said accessed system heuristic rules that matches an identity of said given configuration variable and said determined change tendency for said given configuration variable; and
utilizing said identified given one of said system heuristic rules to determine a new value for one of said user requirement parameters contained in said identified system heuristic rule, said new value for said user requirement parameter resulting in a new system configuration of networked information handling systems having a value for said given configuration variable that matches said targeted configuration variable value.

15. The method of claim 14, wherein said heuristic rules are stored on a storage medium of an information handling system; and wherein said method further comprises receiving at said information handling system said targeted value of said given configuration variable.

16. The method of claim 15, wherein said information comprises a network server; and wherein said method further comprises receiving at said network server said targeted value of said given configuration variable across a network from a user.

17. The method of claim 16, further comprises receiving at said network server a user selection of said one of said user requirement parameters across a network from a user; determining a new value of said given configuration value based on said new value of said selected one of said user requirement parameters; and providing said new system configuration of networked information handling systems based on said new value of said given configuration value.

18. The method of claim 17, further comprising presenting said new value of said given configuration value from said network server to said user across said network.

19. The method of claim 18, further comprising receiving at said network server a user selection of a second and different one of said user requirement parameters across said network from said user; utilizing said identified given one of said system heuristic rules to determine a new value of said second and different selected user requirement parameter; utilizing said accessed set of system heuristic rules to determine a new value of said given configuration value based on said new value of said second and different user requirement parameter; providing a second new system configuration of networked information handling systems based on said new value of said given configuration value; and presenting said second new value of said given configuration value from said network server to said user across said network.

20. The method of claim 18, further comprising receiving at said network server a new targeted value of a second and different configuration variable across said network from said user; determining a change tendency for said second and different configuration variable by comparing said new targeted configuration variable value with said initial configuration variable value for said given configuration variable; identifying a given one of said accessed system heuristic rules that matches an identity of said second and different configuration variable and said determined change tendency for said second and different configuration variable; receiving at said network server a second user selection of one of said user requirement parameters across a network from a user; utilizing said identified given one of said system heuristic rules that matches an identity of said second and different configuration variable to determine a new value of said second selected user requirement parameter; determining a new value of said second and different configuration variable value based on said new value of said second selected user requirement parameter; providing a new system configuration of networked information handling systems based on said new value of said second and different configuration variable value; and presenting said new value of said second and different configuration value from said network server to said user across said network.

21. The method of claim 14, further comprising assembling components of said new system configuration of networked information handling system.

* * * * *